July 21, 1964 R. I. MORLEY 3,141,530

DIFFERENTIAL FORCING APPARATUS

Filed May 1, 1961 2 Sheets-Sheet 1

INVENTOR.
ROBERT I. MORLEY
BY Allan Rothenberg
ATTORNEY

INVENTOR.
ROBERT I. MORLEY
BY Allan Rothenberg
ATTORNEY

United States Patent Office 3,141,530

Patented July 21, 1964

3,141,530

DIFFERENTIAL FORCING APPARATUS

Robert I. Morley, Norwalk, Calif., assignor to North American Aviation, Inc.

Filed May 1, 1961, Ser. No. 106,961
20 Claims. (Cl. 188—163)

This invention relates to differential forcing apparatus and more particularly to such apparatus wherein rapid application and removal of force is provided by a predetermined relative variation of differentially applied forces.

While the invention is of utility in many applications where high speed force control is desired, a specific embodiment thereof will be described for purposes of exposition as applied to the driving and stopping of the tape of a tape reader.

In the development of high-speed data processing systems, employing tape as the data storage medium, great stress has been placed upon the ability of such systems to rapidly scan and read-out the data recorded upon such storage medium by means of a suitable tape-reader mechanism. A tape reader mechanism consists of read-out heads for reading the data recorded upon the tape, a tape drive for transporting the tape past the read-out heads, and breaking means cooperating with the tape drive for stopping the tape at a desired frame or line. Currently, photoelectric devices are employed as high-speed read-out devices for perforated mylar tapes and have increased the limit speeds at which such tapes may be processed or transported and "read." In fact, the limits at which such tapes may be transported is currently limited mainly by the speed of the logic circuits associated with such read-out devices. In other words, the high-speed logic circuits cannot process the data as fast as the data may be transported and "read." However, such high-speed data reading and processing capability is necessarily compromised further where low-speed braking means are employed in cooperation with the tape drive means of the tape reader.

For instance, the rapid processing of data in accordance with a predetermined program may require employing data in other than the sequence in which it has been recorded on the frames or lines of tape. Such a program involves transporting the tape back and forth in such a manner as to present the desired sequence of frames to the read-heads for read-out purposes. Therefore, high-speed data processing may require short stopping times as well as fast tape transport and reading speeds. Accordingly, it is an object of this invention to provide an improved means for combining fast reading speeds with short stopping times.

It has been seen that to effectively utilize the high-speed tape transport capability of a high-performance tape-reader also requires the capability of such a device to stop transport of the tape quickly. Generally such stopping transport of the tape is accomplished by energizing a solenoid or other electromechanical device by means of a control circuit for applying a braking force to the tape. Such force relies upon a well designed brake pad having a suitably high coefficient of friction.

In currently used devices, the braking sequence is initiated upon receiving a stop command in the form of a signal activating the control circuit for the electromechanical brake device. The time sequence involved in stopping the tape entails three time constants, the sum of the effects of which determines the total elapsed time required to stop the tape. These three time constants are:

(1) The electrical time constant of a brake solenoid, which is a function of the solenoid circuit inductance and resistance, (2) The mechanical time constant of the brake motion which is a function of the moment of inertia and geometry of a rotational mechanical system, and (3) The mechanical time constant of the tape after the braking force has been applied.

The combined effect of these constants in current devices usually results in an elapsed time for braking from one to five milliseconds.

The device of the subject invention reduces the effect of the $L/R$ electrical time constant of the solenoid circuit (where L is the circuit inductance and R is the circuit resistance). The device of the subject invention also permits reduction of the mechanical time constant of the brake motion. The reduction in the mechanical time constant is limited only by the degree of mechanical tolerances or machining perfection available in the manufacture of the device. The third contributing time constant (e.g., that of the tape) is normally very small relative to the other two time constants.

In many applications of other types of tape brake-drive mechanisms, fast stopping is sought to be achieved by operating a drive solenoid against a preloaded brake spring, which spring provides a braking force upon de-energization of the drive solenoid. A disadvantage of such a scheme is the large magnetization force and associated large $L/R$ time constant required for starting. In other words, fast stopping may be thus achieved at a cost of slow starting. Therefore, it is a further object of this invention to provide improved means for combining fast reading speeds with short starting times.

In carrying out the principles of this invention in accordance with a preferred embodiment thereof, there is provided first and second force devices for applying mutually opposing forces to a member to be forced, and energizing means responsive to an input signal for energizing both said devices to effect exertion of quiescent hold-in forces by said devices. The energizing means includes starting means for providing a starting transient force in the first device which is large relative to the quiescent hold-in force exerted by said first device upon the member, said starting transient force and said quiescent hold-in force being respectively larger than and less than the quiescent force exerted by the second device upon said member after said starting transient has subsided.

More specifically, there is provided a brake solenoid in a first magnetic circuit with a pivotally-mounted magnetically-permeable toggle for urging said toggle into a first angular or brake position, and a drive solenoid arranged in a second magnetic circuit with the toggle for urging said toggle into a second angular or tape-release position in opposition to the brake solenoid. Cooperating with the drive solenoid is current limiting means for limiting the magnetomotive holdng force of the drive solenod to a minimum magnitude necessary for overcoming the magnetomotive force exerted upon the toggle by the brake solenoid when said toggle is in the second or drive position.

Alternate modes of operation are achieved by switching means for providing a magnetizing current to each of the solenoids. Transient starting current means, cooperating with said solenoids and switching means in said drive mode, causes an underdamped transient in the drive solenoid to initially overcome any magnetomotive force exerted upon the toggle by the brake solenoid when said toggle is in either of said first or second positions, thereby achieving high-speed starting or rotation of the toggle to the second or drive position. In other words, energization of the brake solenoid is initially delayed relative to energization of the drive solenoid while the latter is subjected to an initial surge of relatively high level.

Upon switching-off of the magnetizing current signal from the switching means, high-speed stopping or rotation of the toggle to the first or brake position is accomplished by initial decay of the magnetizing current in the drive solenoid such that the associated magnetomotive force is insufficient to offset that of the brake solenoid. A time delay device in the brake solenoid control circuit prevents immediate decay of the brake solenoid magnetomotive force which, upon decay of the drive solenoid holding force, overpowers the drive solenoid holding-force to operate the toggle. Because the time-interval for decay of the drive solenoid magnetomotive force below the hold-in level is only a small fraction of the time constant for that solenoid, and because the brake solenoid remains energized during the time interval necessary for braking, the effective electrical time constant for braking or stopping is less than that for either of the two solenoid circuits.

Therefore, it is also an object of this invention to provide improved means for reducing the electrical time constant associated with the stopping times for electro-mechanical-type tape drive mechanisms. It is another object of this invention to provide improved means to increase the speed of application and removal of a force by control of the relation between a pair of differentially applied forces.

It is a further object to provide means for reducing the effective mechanical time constant associated with the stopping times for electro-mechanical-type tape drive mechanisms.

It is still a further object to provide improved starting speeds for tape drive mechanisms.

Yet a further object of this invention is to provide improved means for short starting times and short stopping times in tape drive mechanisms.

A further object of this invention is to increase the speed of operation of a differentially controlled two-state electromechanical armature device.

Another object of this invention is to provide an improved tape drive mechanism.

These and other objectives of this invention will become apparent from the following description taken in connection with the accompanying drawings in which.

In the drawings, like reference characters refer to like parts.

Figure 1:
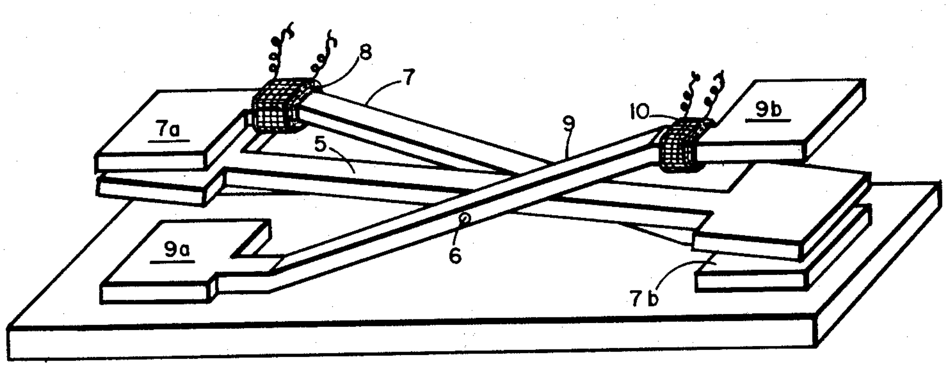
FIG. 1 is an illustration of a representative electromechanical toggle device.

Referring to FIG. 1, there is illustrated a representative electromagnetic toggle device. A toggle arm 5 of magnetically permeable material is pivotally mounted through its center of mass by means of a pivot assembly 6. A first electromagnetic assembly comprising a first magnetically permeable core 7, having a pole face 7*a* and 7*b* at its respective extremities, and having a first solenoid 8 wound thereupon, is arranged in magnetic circuit with toggle arm 5 so as to comprise a magnetic couple or torque, inducing rotation of toggle arm 5 in a clockwise direction, as shown, toward pole faces 7*a* and 7*b* upon energization of solenoid 8. Similarly, there is also provided a second electromagnetic assembly comprising a second magnetically permeable core 9, having a pole face 9*a* and 9*b* at its respective extremities, and having a second solenoid 10 wound thereupon. The second electromagnetic assembly is arranged in magnetic circuit with toggle arm 5 so as to comprise a magnetic couple or torque counter to that generated by first solenoid 8, and inducing a rotation of toggle arm 1 in a counter-clockwise direction, as shown, toward pole faces 9*a* and 9*b*. Thus, there is provided a differential forcing apparatus which will apply initially opposing forces or torques to the arm 5.

If first solenoid 8 of FIG. 1 were energized, by means of an electric current, the resultant magnetic couple would urge the toggle clockwise into a first position toward the pole faces 7*a* and 7*b*, as shown. If second solenoid 10 were to remain unenergized, then the magnetomotive force of solenoid 8 would maintain the toggle in said first position. If second solenoid 10 were subsequently also energized, the counter torque so provided by the magnetomotive force of solenoid 10 would oppose the holding torque provided by solenoid 8. However, in view of the larger air gap and associated larger magnetic reluctance existing in the magnetic circuit formed by toggle arm 5 and pole faces 9*a* and 9*b* relative to the minimal air gap in the magnetic circuit formed by toggle arm 5 and pole faces 7*a* and 7*b* when toggle arm 5 is in the first position, a larger number of magnetizing ampere-turns would be required in solenoid 10 in order to overcome the magnetic couple holding toggle arm 1 in said first position, and to rotate said toggle arm to a second position (toward pole faces 9*a* and 9*b*).

If the magnetic toggle arm, in assuming either of the first or second angular positions, is permitted to touch the pair of pole faces associated with such position, thereby reducing the air gap therebetween to zero, the magnetic circuit formed by the toggle arm and such pole faces is said to be short-circuited. Such a phenomenon is significant for the reason that the opposing solenoid would not ordinarily be able to overcome the holding force thus exerted by the short-circuited magnetic circuit by ordinary design means, in view of the prohibitively greater reluctance provided by the total air gap which now lies wholely within the magnetic circuit of the opposing solenoid. Therefore, good design practice dictates that non-magnetic mechanical means be employed to limit-stop the rotational freedom of the toggle arm as to prevent the toggle arm from contacting the pole faces. Such means might consist, for example, of a coating of non-magnetic material having suitable thickness and hardness, applied to the exposed portion of each pole face.

Figure 2:
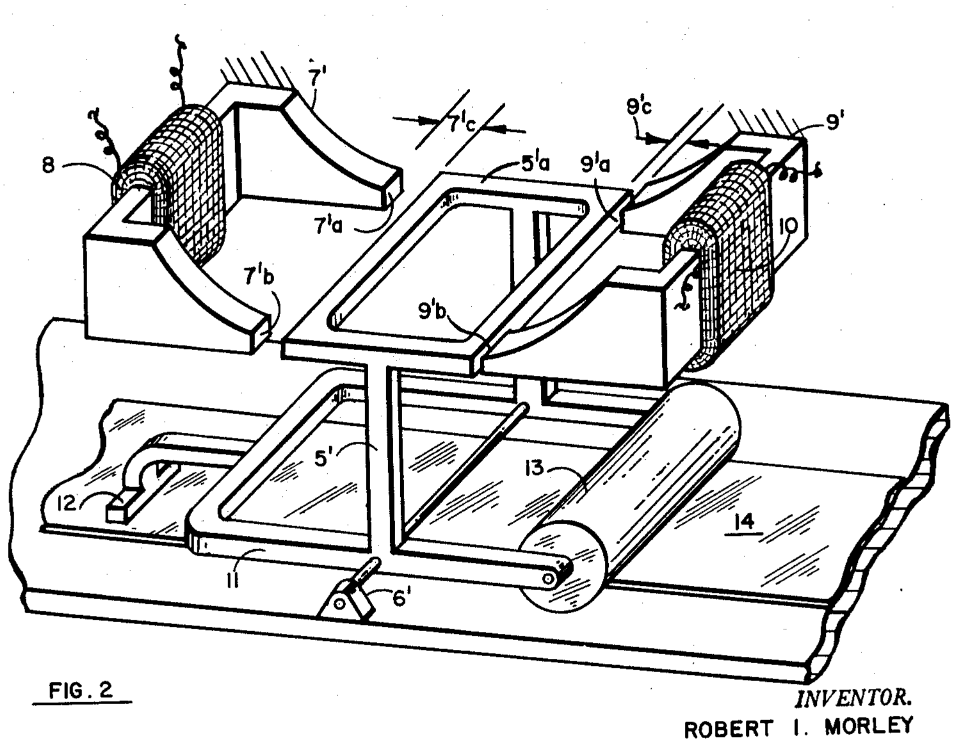
FIG. 2 is an illustration of an alternative embodiment of an electromechanical toggle, as employed in a tape drive mechanism.

Referring to FIG. 2, there is illustrated an alternative embodiment of an electromagnetic toggle device, including adaptation thereof for the operation as a brake-drive device in cooperation with the elements of a tape drive mechanism.

A toggle arm 5′ having an armature 5′*a* of magnetically permeable material, is pivotally mounted by means of pivot assembly 6′. A first electromagnetic assembly comprises a first magnetically permeable core 7′ having a pole face 7′*a* or 7′*b* at each of its two extremities, and having a first solenoid 8 wound thereupon, is arranged in magnetic circuit with armature 5′*a* as to comprise a magnetic couple, inducing rotation of toggle arm 5′ in a counter clockwise direction, as shown, toward pole faces 7′*a* and 7′*b* upon energization of solenoid 8. Similarly, there is also provided a second electromagnetic assembly comprising a second magnetically permeable core 9′ having a pole face 9′*a* at each of its two extremities, and having a second solenoid 10 wound thereupon. The second electromagnetic assembly is arranged in magnetic circuit with armature $5'a$ as to comprise a magnetic couple counter to that generated by energizing solenoid 8, and inducing a rotation of toggle arm 5' in a clockwise direction to a second or drive position, as shown, toward pole faces $9'a$ and $9'b$. Toggle arm 5' is shown in the second or drive position in FIG. 2, as is indicated by the lesser gap $9'c$ between armature $5'a$ and pole faces $9'a$ and $9'b$.

Rigidly affixed to toggle arm 5' and extending perpendicularly thereto with respect to both said toggle arm and the axis of rotation of the pivotally mounted toggle arm, is a rigid brake member 11 having a longitudinal axis at one end of which is a fixedly mounted brake shoe 12 comprising material having a high coefficient of friction, and at the other end of which is a rotatably mounted roller 13. The axis of rotation of roller 13 is arranged parallel to the axis of rotation of the pivotally-mounted toggle arm $5'a$ and perpendicular to the longitudinal axis of brake member 11, as to provide minimum rolling and sliding friction to a supporting surface thereunder moving longitudinally relative to said brake member when toggle arm 5' is in the second or drive position, while brake shoe 12 is arranged to provide maximum sliding friction to such a moving supporting surface when toggle arm 5' is in the first or brake position. Such moving supporting surface would be represented, for example, by a tape 14 being transported across a platen or the like. The arrangement of the brake assembly and toggle arm as described, may also be made to prevent magnetic armature $5'a$ from contacting the pairs of pole faces, and thereby avoid magnetic short circuits. For example, the geometrical extent of brake shoe 12, in achieving braking action when the toggle is in the brake position, necessarily prevents the toggle from contacting the pole faces of the core for the brake solenoid. The geometrical extent of roller 13, including the radius thereof, may be selected to prevent contact of the toggle arm armature with the pole faces of the core for the drive solenoid when the toggle is in the drive position.

Figure 3:
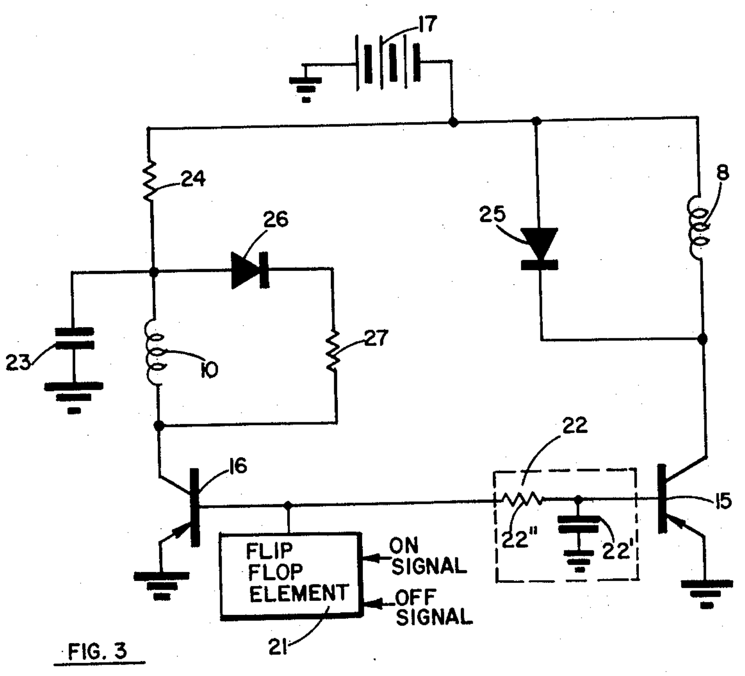
FIG. 3 is a functional schematic of a preferred embodiment of the invention, for control of the devices of FIG. 1 and FIG. 2.

Energization of solenoids 8 and 10 to effect the brake and drive modes of operation of the brake-drive device of FIG. 2 is preferably accomplished in a particular sequence and manner (to be described) by means of the control circuit of FIG. 3.

Referring to FIG. 3, there is illustrated a schematic diagram of a preferred embodiment of a control circuit for operating the devices of FIG. 1 and FIG. 2, which control circuit comprises the first solenoid 8 and second solenoid 10 of FIG. 1 and FIG. 2. First and second transistors 15 and 16 are connected in series circuit with solenoid 8 and 10 respectively, and a common D.-C. excitation source 17, one of the emitter and collector electrodes of said first and second transistors being connected to said voltage source through ground, and the other of the emitter and collector electrodes of said first and second transistors being connected to one of two terminals of said first and second solenoid, respectively. The other of the two terminals of said first and second solenoid is connected to the common excitation source 17 for energizing said solenoids.

The control electrode of each of transistors 15 and 16 is connected in electrical circuit to a common output of single-pole switching means 21, which is responsively connected to a two-state signal input designated "Off" and "On," for switching transistors 15 and 16 off and on together. For example, an "On" or drive signal will operate to close the switch means and provide a signal of proper polarity to each transistor base to cause conduction. An "Off" or brake signal will effect removal of the base driving signal in providing a potential which effects cutoff of the transistors. Such two-state switching means 21 may be comprised, for example, of a flip-flop circuit or other bi-stable circuit device as is well-known and understood by those skilled in the art, and is therefore illustrated diagrammatically only.

Interposed in series circuit between first transistor 15 and the output of switching means 21 is a time delay element 22 for delaying conduction by first transistor 15 and hence delaying the build-up of a magnetizing current in first brake solenoid 8 relative to second drive solenoid 10, upon the switching-on of switch means 21 in response to a drive signal. Such a device may be comprised, for example, of a time delay capacitor 22' in parallel electrical circuit with the control electrode of first transistor 15 and a time delay resistor 22'' in series circuit between said transistor and the output of said switching means.

A capacitor 23 is connected in parallel circuit across the second terminal of drive solenoid 10 and ground, for providing a large starting current surge or transient through drive solenoid 10 upon switching-on of switching means 21. A limiting resistor 24 is connected in series electrical circuit between the second terminal of drive solenoid 10 and supply voltage source 17 for limiting the steady-state or quiescent current through the drive solenoid, when energized, to that minimum level required to hold toggle arm 5' (in FIG. 2) in the second or drive position, in opposition to the magnetomotive forces exerted by brake solenoid 8 through the larger air gap $7c$.

A first and second unidirectional shunt impedance is connected in circuit across the two terminals of first solenoid 8 and second solenoid 10 respectively, for reducing inductive reverse current through the transistors 15 and 16 incident to de-energizing the solenoids, upon switching off the D.-C. excitation source 17. The first unidirectional shunt impedance comprises first diode 25. The second shunt impedance comprises second diode 26 and shunting resistor 27 in order to achieve over-damping of the second-order circuit parameter represented by the combination of inductor 10 and capacitor 23 and to obtain a shorter electrical time constant for decay of the inductive reverse current in second solenoid 10 relative to first solenoid 8, for reasons which will become apparent from the following explanation of the operation of the device.

Figure 4:
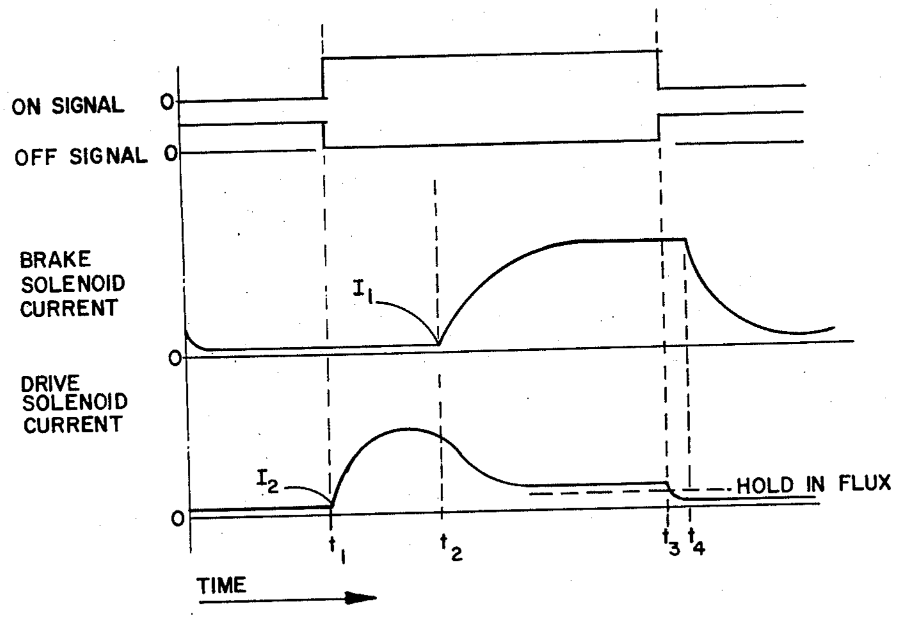
FIG. 4 is a representative time-history illustrating the magnetizing current wave shapes generated by one operational sequence of the embodiment of FIG. 3.

FIG. 4 illustrates a timing diagram representing the magnetizing current generated in the several solenoids of FIG. 3, for one operational sequence of the embodiment of the invention illustrated in FIG. 3. Curves $I_1$ and $I_2$ represent amplitudes of the magnetizing currents in solenoid 8 and 10, respectively, as functions of time. The timing diagram indicates four major changes of state in the circuit device of FIG. 3, which changes correspond to either switching on or switching off the device.

In summary, $t_1$ represents the time when a start signal is received, $t_2$ the time when the toggle attains the drive position, $t_3$ the time when a stop signal is received, and $t_4$ the time when the toggle attains the brake position. This completes a representative start-stop cycle to which the device would be subjected. After $t_4$ and decay of the brake solenoid current the device is in the brake position, ready for another start signal.

The point in time indicated by $t_1$ represents a switching-on of the device by means of a suitable drive signal input to switching means 21 of FIG. 3 which will provide a relatively negative signal to transistor 16 and time delay element 22. The timing diagram prior to that point of time indicates that only a leakage current from first transistor 15 and second transistor 16 flows through first solenoid 8 and second solenoid 10 respectively. Immediately subsequent to time $t_1$ and the switching-on of first and second transistors 15 and 16, no appreciable change occurs to the current flow $I_1$ through brake solenoid 8, due to the action of the time delay means 22, while a large surge current (represented by the rapid build up of $I_2$) flows through drive solenoid 10. This initial drive solenoid transient and concurrent brake solenoid delay provides means for the drive solenoid to overpower the brake solenoid in urging the toggle arm to the drive position.

The point in time indicated by $t_2$ in FIG. 4 approximately represents the time at which the toggle arm approaches the drive position and also the initiation of the first order electrical transient ($L/R$ electrical time constant effect) in energizing the brake solenoid upon termination of the time delay period of the time delay device which is in series with the brake solenoid. The subsequent level or zero-slope of the magnetization currents $I_1$ and $I_2$ represents the quiescent or steady-state excitation occurring in solenoids 8 and 10, respectively, upon subsidence of the starting current transients. It is to be noted that the steady state value for the brake solenoid current is greater than that for the drive solenoid current, and is intended to represent a correspondingly greater flux. However, because of the larger air gap in the brake solenoid magnetic circuit (when the toggle arm is in the drive position), the larger steady-state brake solenoid flux is unable to overpower the drive solenoid. In other words, only a small steady value of $I_2$ is required to maintain a drive-position hold-in flux capable of balancing the force exerted by brake solenoid. A value of $I_2$ slightly in excess of this holding value (as achieved by limiting resistor 24) is employed to assure affirmative control.

The point in time indicated by $t_3$ in FIG. 4 represents the time at which a stop signal is applied to switching means 21 of FIG. 3. Subsequent to that point in time, current $I_2$ in drive-solenoid 10 quickly decays, by means of the unidirectional shunt impedance comprising elements 26 and 27; while time delay means 22 initially maintains current $I_1$ in solenoid 10. Hence, the required hold-in flux level is essentially unchanged for an interval immediately following the step signal and only a minimum time interval is required for current $I_2$ to decay below the hold-in level, thereby resulting in rapid actuation of the toggle-arm into its brake position.

The point in time indicated by $t_4$ in FIG. 4 represents the time at which the toggle approaches the brake position and also the initiation of the electrical decay transient of current $I_1$ in the brake solenoid by means of unidirectional shunt element 25. The total time constant, including both the time delay means and the unidirectional shunt means, for brake solenoid 8 is longer than that for drive solenoid 10 to assure positive brake-action in, say, stopping a tape. However, the upper limit desired for such time constant is determined from consideration of recovery time or speed in recovering from affirmative brake action, whereby a stopped tape may be restarted or an electromechanical toggle re-toggled to the drive position.

The time $t$ required for a toggle to traverse the distance between two positions is a function of the distance $l$ to be traversed, the mass $m$ of the toggle, and the difference force F acting upon the toggle. Transposing the expression, $F=ma$, where $a$ is acceleration:

$$a=\frac{F}{M} \quad (1)$$

If the acceleration is constant, then:

$$l=\tfrac{1}{2}at^2 \quad (2)$$

$$t=\sqrt{\frac{2l}{a}}=\sqrt{\frac{2lm}{F}} \quad (3)$$

Therefore, the several means for reducing the mechanical time constant $t$, is to reduce the air gap $l$, reduce the toggle mass $m$, or to increase the force differential F.

In other words, the smaller is the gap which is required to be thus traversed, the less is the time interval required to traverse such gap. Also, the smaller the overall total gap length between the solenoids, within which the toggle moves, the less the difference in gap length need exist or is required in order to create a *given* difference in magnetomotive force.

Conversely, the minimum force required is a function of the minimum gap obtainable. Since it is easier to adjust and maintain precision in a given differential force in the electromagnetic circuit of the illustrated embodiment than it is to machine and maintain an equivalent precision in the geometry of a toggle piece in production, the smallest gap (and hence the smallest mechanical time constant) is determined by the minimum mechanical tolerance achievable in production. Therefore, it is to be appreciated that the illustrated embodiment for the control circuit of FIG. 3 also comprises means for reducing the mechanical time constant of the devices of FIGS. 1 and 2.

It will be seen that the device of this invention provides improved and reliable means for achieving high-speed starting and stopping of an electromechanical toggle. While the illustrated embodiment of the invention demonstrates its applicability to the brake-drive mechanism of a tape reader, it is not limited to such application, and is suitable for other applications such as, for example, high speed electromechanical relays.

Although the invention has been described in detail, it is to be clearly understood that the same is by way of illustration and example only and is not to be taken by way of limitation, the spirit and scope of this invention being limited only by the terms of the appended claims.

I claim:

1. Differential forcing apparatus comprising first and second devices for applying mutually opposing forces to a member to be forced, energizing means responsive to an input signal for energizing both said devices to effect exertion of quiescent hold-in forces by said devices, said energizing means including starting means for providing a starting transient force in the first device which is large relative to the quiescent hold-in force exerted by said first device upon said member, said starting transient force and said quiescent hold-in force being respectively larger than and less than the quiescent hold-in force exerted by said second device upon said member after said starting transient has subsided.

2. Differential forcing apparatus comprising first and second devices for applying mutually opposing forces to a member to be forced, energizing means responsive to an input signal for energizing both said devices, said energizing means including transient means for initially effecting relatively large energization of the first device and relatively small energization of the second device, and steady state means for subsequently effecting relatively small and large energizations of said first and second device respectively.

3. Differential forcing apparatus comprising first and second devices for applying mutually opposing forces to a member to be forced, energizing means responsive to an input signal for energizing both said devices, said energizing means including transient means for initially effecting relatively large energization of the first device and relatively small energization of the second device, and decay means responsive to a subsequent signal for causing decay of the energization of said first device and delayed decay of energization of the second device.

4. A differential forcing mechanism comprising an armature mounted for motion between first and second positions, first and second force devices for moving said armature to respective one of said positions, transient means responsive to an input signal for causing said second force device to exert a relatively large force on the armature sufficient to move it to said second position, said transient means including steady-state means responsive to the input signal for causing a relatively large energization of said first force device while causing a decreased energization of said second force device and decay means for delaying the decay of energization of the secand force device relative to decay of energization of the first force device when the input signal is terminated.

5. In a force control mechanism, differential forcing means for alternately applying oppositely directed forces to a magnetic member comprising: a control circuit responsive to a signal for operating said differential forcing means, a first solenoid and second solenoid responsively connected to said control circuit, said magnetic member being in magnetic circuit with each of said solenoids, said solenoids being arranged with respect to each other and said magnetic member wherein the magnetomotive force of each solenoid upon said magnetic member is in opposition to that of the other, means including said first solenoid for reducing the effect of the electrical time constant of said second solenoid, and means for reducing the mechanical time constant of said magnetic member.

6. In a tape reader mechanism, a brake-drive means for alternately stopping and releasing a tape, comprising: a first force device, a control circuit responsive to an input signal for energizing said first force device to effect exertion of a quiescent force, said device being responsively connected to said control circuit, a braking member to be forced against the tape arranged to cooperate with said first force device to achieve motion of said member, second means for reducing the effect of the time constant of said force device, and third means for reducing the effect of the mechanical time constant of said member.

7. The device of claim 6 in which said second means comprises a second force device responsively connected to said control circuit, said second force device arranged to cooperate with said member to oppose said first force device, starting means cooperating with said second force device for providing a large starting transient force in said second force device relative to a quiescent hold-in force exerted by said second force device upon said member, said starting transient and subsequent quiescent hold-in force of said second device being respectively larger than and less than the quiescent force exerted by said first force device upon said member.

8. In a tape reader mechanism, a brake-drive means for alternately stopping and releasing a tape, comprising: a brake solenoid, a control circuit responsive to an input signal for energizing said solenoid to effect exertion of a quiescent force, said solenoid being responsively connected to said control circuit, a rotatably mounted mechanical brake arm of magnetically permeable material, said brake arm and brake solenoid cooperating in said magnetic circuit to achieve a braking moment about said pivot, second means for reducing the effect of the electrical time constant of said brake solenoid, and third means for reducing the effect of the mechanical time constant of said brake arm.

9. The device of claim 8 in which said second means comprises a drive solenoid responsively connected to said control circuit, said drive solenoid being in magnetic circuit with said brake arm and arranged therewith to oppose said brake solenoid, starting current means in circuit with said drive solenoid for providing a large starting transient magnetomotive force in said drive solenoid relative to a quiescent hold-in magnetomotive force exerted by said drive solenoid upon said brake arm, said starting transient and subsequent quiescent hold-in magnetomotive force being respectively larger than and less than the quiescent magnetomotive force exerted by said brake solenoid upon said brake arm while stopping said tape.

10. The device of claim 9 in which said second means further comprises a time-delay interposed between said control circuit and said brake solenoid.

11. A brake-drive mechanism having alternative drive and brake modes of operation, comprising a pivotally-mounted toggle arm of magnetically permeable material constrained to rotate between a drive position and a brake position in said drive and brake modes of operation respectively, a brake solenoid in magnetic circuit with said toggle arm, a drive solenoid in magnetic circuit with said toggle arm and arranged therewith to oppose the magnetomotive force exerted upon said toggle arm by said brake solenoid, switching means for applying a D.-C. operating current to a first terminal of each of said solenoids during the drive mode, time delay means interposed in series with said switching means and said brake solenoid, current limiting means in series with a second terminal of said drive solenoid for providing a quiescent magnetomotive force alternately less than and greater than that exerted by the brake solenoid upon the toggle arm when such toggle arm is in the brake and drive positions respectively, starting current means in circuit with said drive solenoid for providing a transient current through said drive solenoid upon initiation of the drive mode, the magnitude of which exceeds that of the quiescent current through said brake solenoid, first and second unidirectional means electrically connected across said brake solenoid and drive solenoid respectively for providing a shunt path for reducing inductive kick-back upon removal of the operating signal current.

12. In combination with a brake solenoid in magnetic circuit with a shiftably-mounted magnetically permeable armature arranged to be urged by said brake solenoid into a first position, a drive solenoid arranged in magnetic circuit to urge said armature into a second position, means for applying a magnetizing current to each said solenoid, current limiting means for limiting the magnetomotive force exerted by the drive solenoid to a minimum magnitude necessary to overcome the magnetomotive force exerted upon said armature by said brake solenoid when said armature is in said second position, transient starting current means cooperating with said drive solenoid for initially overcoming the magnetomotive force exerted upon said armature by said brake solenoid when said armature is in said first position wherein said armature is restored to said second angular position.

13. The device of claim 12 in which said transient starting current means comprises a capacitor electrically connected in circuit with said drive solenoid.

14. In combination with a brake solenoid in magnetic circuit with a shiftably-mounted magnetically permeable armature for urging said armature into a first position, a drive solenoid arranged in magnetic circuit to urge said armature into a second position with a magnetomotive force not substantially greater than a magnitude necessary to overcome the magnetomotive force exerted upon said armature by said brake solenoid when said armature is in said second position, switching means for applying a magnetizing current to each said solenoid, and time-delay means interposed between said brake solenoid and said switching means for delaying the response of said brake solenoid to said switching means.

15. In combination with a brake solenoid in magnetic circuit with a pivotally-mounted magnetically permeable toggle for urging said toggle into a first angular position: a drive solenoid arranged in magnetic circuit to urge said toggle into a second angular position, current limiting means for limiting the magnetomotive force of said drive solenoid to a minimum magnitude necessary to overcome the magnetomotive force exerted upon said toggle by said brake solenoid when said toggle is in said second position, switching means for applying a magnetizing current to each said solenoid, transient starting current means cooperating with said solenoids for causing the drive solenoid to initially overcome the magnetomotive force exerted upon said toggle by said brake solenoid when said toggle is in said first angular position wherein said toggle is restored to said second angular position.

16. The device of claim 15 in which said current limiting means comprises an impedance in series circuit with said drive solenoid.

17. The device of claim 15 in which said transient starting current means comprises: a capacitor electrically connected in circuit with the drive solenoid, and a time-delay device interposed between said switching means and said brake solenoid.

18. In a tape reader mechanism, brake-drive means for alternately stopping and releasing a tape, comprising: a mechanical brake including a magnetically permeable toggle, a control circuit responsive to a signal for operating said brake-drive means, a drive solenoid and brake solenoid responsively connected to said control circuit, said magnetic toggle in magnetic circuit with each of said solenoids, said solenoids arranged with respect to each other and said magnetic toggle whereby the magnetomotive force of each solenoid upon said magnetic toggle is in opposition to that of the other, second means for reducing the effect of the electrical time constant of said brake solenoid, third means for reducing the effect of the electrical time constant of said drive solenoid, and fourth means for reducing the mechanical time constant of said brake arm.

19. The device of claim 18 wherein said second means includes said drive solenoid, drive solenoid unidirectional shunt means and brake solenoid unidirectional shunt means for reducing inductive kickback in said drive and brake solenoid respectively, said drive solenoid shunt means providing a substantially shorter time constant than said brake solenoid shunt means.

20. The device of claim 18 wherein said third means comprises a capacitor electrically connected between one terminal of two terminals of said drive solenoid and a point of fixed potential, the other terminal of said drive solenoid being connected to said control circuit, current limiting means in series circuit with said drive solenoid for limiting the steady-state magnetomotive force exerted by said drive solenoid upon said toggle to a minimum magnitude for holding said toggle in a drive position against the magnetomotive force exerted upon said toggle by said brake solenoid, and time-delay means interposed between said brake solenoid and said control circuit.

References Cited in the file of this patent

UNITED STATES PATENTS 2,437,756 Rosing et al. ------------ Mar. 16, 1948